United States Patent
Kobayashi

(10) Patent No.: US 11,122,172 B2
(45) Date of Patent: Sep. 14, 2021

(54) CONTROL APPARATUS, IMAGE FORMING SYSTEM AND PROGRAM

(71) Applicant: Konica Minolta, Inc., Tokyo (JP)

(72) Inventor: Minako Kobayashi, Ikeda (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/800,147

(22) Filed: Feb. 25, 2020

(65) Prior Publication Data

US 2020/0296236 A1 Sep. 17, 2020

(30) Foreign Application Priority Data

Mar. 15, 2019 (JP) .............................. JP2019-048837

(51) Int. Cl.
*G06F 3/12* (2006.01)
*H04N 1/00* (2006.01)
*G10L 15/22* (2006.01)

(52) U.S. Cl.
CPC ......... *H04N 1/00403* (2013.01); *G10L 15/22* (2013.01); *H04N 1/00395* (2013.01); *H04N 1/00891* (2013.01); *H04N 1/00896* (2013.01); *G10L 2015/223* (2013.01)

(58) Field of Classification Search
CPC ........... H04N 1/00403; H04N 1/00395; H04N 1/00891; H04N 1/22; H04N 1/00896; G10L 15/22; G10L 2015/223
See application file for complete search history.

(56) References Cited

U.S. PATENT DOCUMENTS

| | | | | |
|---|---|---|---|---|
| 2016/0192022 A1* | 6/2016 | Ui | .............. | H04N 21/6125 725/53 |
| 2019/0199880 A1* | 6/2019 | Abe | .............. | G06F 3/1229 |
| 2020/0267268 A1* | 8/2020 | Yokoyama | .............. | G03G 15/502 |

FOREIGN PATENT DOCUMENTS

| JP | 2007-021808 A | 2/2007 |
|---|---|---|
| JP | 2015-041123 A | 3/2015 |

\* cited by examiner

*Primary Examiner* — Moustapha Diaby
(74) *Attorney, Agent, or Firm* — BakerHostetler

(57) ABSTRACT

A control apparatus may cause an image forming apparatus to execute processing based on contents of the processing instructed by voice. The control apparatus includes a hardware processor that may: cause a display apparatus of the image forming apparatus to display the contents of the processing prior to execution of the processing; acquire an operating state of the display apparatus; and decide contents of voice to be outputted to promote confirmation of the contents of the processing in accordance with the acquired operating state of the display apparatus.

16 Claims, 9 Drawing Sheets

CONTROL APPARATUS, IMAGE FORMING SYSTEM AND PROGRAM

CROSS REFERENCE TO RELATED APPLICATIONS

This application claims priority to Japanese Patent Application No. 2019-048837, filed on Mar. 15, 2019, which is incorporated herein by reference in its entirety.

BACKGROUND

Technological Field

The present disclosure relates to a control apparatus, an image forming system, and a program for giving a voice instruction to an image forming apparatus. More particularly, disclosed is a technique for suppressing prolongation of a waiting time for a user to give a voice instruction to an image forming apparatus.

Description of the Related Art

In recent years, the spread of smart speakers and IoT devices has led to an increase in devices that can be manipulated by voice using the smart speakers, and image forming apparatuses are also expected to be compatible with such voice manipulation in order to improve the convenience of a user. Specifically, voice input is accepted by a microphone to generate voice data, the voice data is converted into text data by voice recognition, and the text data is subjected to natural language analysis, thereby specifying the instruction contents. Furthermore, the instruction contents are converted into a command for an image forming apparatus, and the command is inputted into the image forming apparatus, thereby executing a voice instruction.

There are a large number of setting items in a job of the image forming apparatus, and it is desirable that the user can confirm the setting contents prior to the execution of the job, such as immediately before the execution of the job or at the time of user setting. This applies not only to manual setting, but also to voice setting. When confirming the setting contents of the job, there may be a case where an item that the user has not set is also confirmed in consideration of the possibility of setting omission by the user.

Accordingly, it takes a very long time for the image forming apparatus to confirm the setting contents by voice output. It takes even longer when the user misses confirmation voice and listens to the confirmation voice again. From this point of view, it can be said that it is efficient to display a list of the setting contents on a manipulation panel for the user confirm.

As described above, it is more efficient to confirm by displaying the instruction contents on the manipulation panel than by voice in some cases when the user confirms the instruction contents before the instruction received by the voice from the user is executed.

However, in a state where the manipulation panel is turned off due to a power saving mode or the like of the image forming apparatus, or in a state where another user is using the manipulation panel, it is impossible to display the instruction contents (in the above example, the list of the setting contents of the job) for the user to confirm.

To cope with a case where the manipulation panel is turned off due to the power saving mode, for example, a technique in which the contents of the voice command are carefully examined and the image forming apparatus is returned from the sleep state to a degree with which the requested function can be utilized (see JP 2015-041123 A), and a technique in which the image forming apparatus is returned only when the image forming apparatus has a requested function (see JP 2007-021808 A) have been suggested. In this way, the manipulation panel is returned to an operable state so that the instruction contents can be displayed for the user to confirm.

However, in the above-described conventional techniques, the instruction contents cannot be displayed until the manipulation panel returns to the operable state. Thus, there is a problem that it takes too much time to start the user confirmation.

In addition, there is another problem that it is necessary to wait until the manipulation panel can be used when another user is in a state of using the manipulation panel.

SUMMARY

The present disclosure has been made in light of the above problems, and an object thereof is to provide a control apparatus, an image forming system and a program which may enable efficient confirmation of processing contents of voice instruction depending on the operating state of a manipulation panel.

To achieve the abovementioned object, according to an aspect of the present disclosure, there is provided a control apparatus that may cause an image forming apparatus to execute processing based on contents of the processing instructed by voice. The control apparatus, reflecting one aspect of the present disclosure, may comprise a hardware processor that may: cause a display apparatus of the image forming apparatus to display the contents of the processing prior to execution of the processing; acquire an operating state of the display apparatus; and decide contents of voice to be outputted to promote confirmation of the contents of the processing in accordance with the operating state of the display apparatus acquired.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure.

DETAILED DESCRIPTION OF EMBODIMENTS

Hereinafter, one or more embodiments of a control apparatus, an image forming system and a program according to the present disclosure will be described with reference to the drawings. However, the scope of the disclosure is not limited to the disclosed embodiments.

[1] Configuration of Image Forming System

First, the configuration of the image forming system according to the present embodiment will be described.

Figure 1:
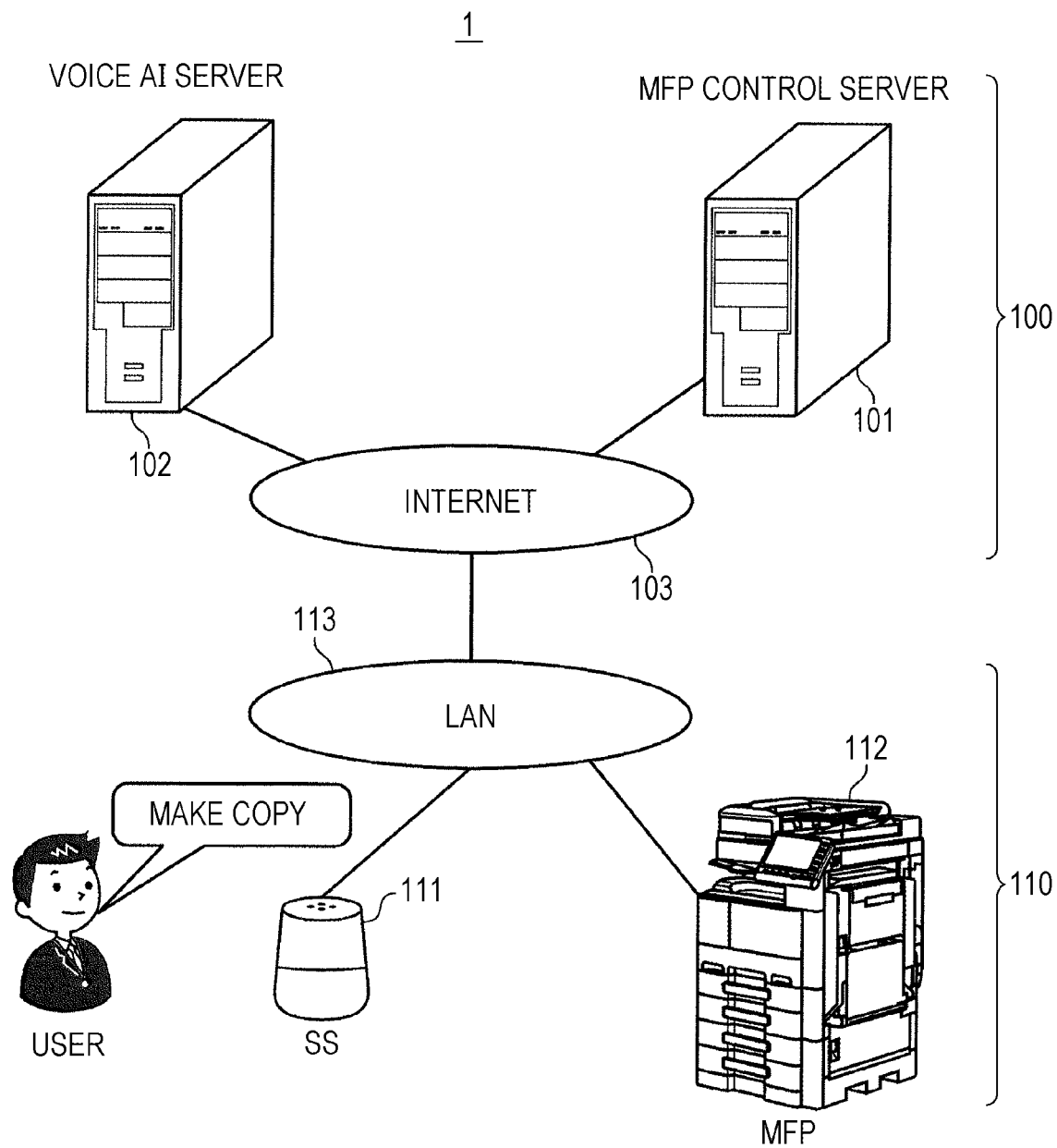
FIG. 1 is a diagram showing the main configuration of an image forming system.

As shown in FIG. 1, an image forming system 1 includes a cloud system 100 and a user system 110. The user system 110 is a system in which a smart speaker (SS) 111 and a multifunction peripheral (MFP) 112 are connected to a local area network (LAN) 113.

And, the cloud system 100 is a system in which two cloud servers, an MFP control server 101 and a voice artificial intelligence (AI) server 102, are connected to the Internet 103. The LAN 113 is also connected to the Internet 103. The smart speaker 111, the voice AI server 102 and the MFP control server 101 constitute a voice interface apparatus for a user to give a voice instruction to the multifunction peripheral 112.

Figure 2:
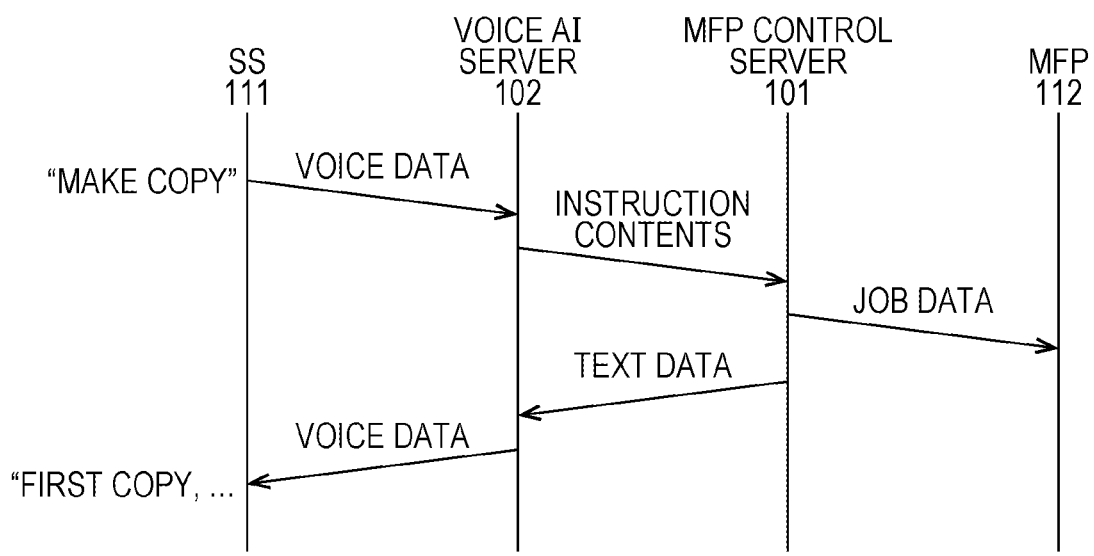
FIG. 2 is a sequence diagram illustrating the operation of the image forming system.

As shown in FIG. 2, when the user of the multifunction peripheral 112 inputs an instruction, such as "make a copy," into the smart speaker 111 by voice, the smart speaker 111 generates voice data from a voice signal and transmits the voice data to the voice AI server 102 via the LAN 113 and the Internet 103.

The voice AI server 102 generates text data from the voice data by voice recognition processing and further subjects the text data to natural language analysis processing, thereby extracting instruction contents for the multifunction peripheral 112. The voice AI server 102 may execute the voice recognition processing and the natural language analysis processing by using a known AI technique or a technique other than the AI technique. The voice AI server 102 transmits the extracted instruction contents to the MFP control server 101.

The MFP control server 101 is a control apparatus that controls the multifunction peripheral 112. When received the instruction contents from the voice AI server 102, the MFP control server 101 generates a command corresponding to the instruction contents and transmits the command to the multifunction peripheral 112 associated with the smart speaker 111 that has accepted the voice instruction. The command is, for example, an instruction to execute a job such as a scan job or a print job, an instruction to change setting contents of a job, or the like. The MFP control server 101 also monitors the operating state of the multifunction peripheral 112 and transmits, to the voice AI server 102, a response text (text data) appropriate for the operating state of the multifunction peripheral 112.

When received the response text from the MFP control server 101, the voice AI server 102 synthesizes voice data from the response text by voice synthesis processing and transmits the voice data to the smart speaker 111 by a streaming method. The smart speaker 111 sequentially outputs, by voice, the received voice data.

[2] Configuration of Smart Speaker 111

Next, the configuration of the smart speaker 111 will be described.

Figure 3:
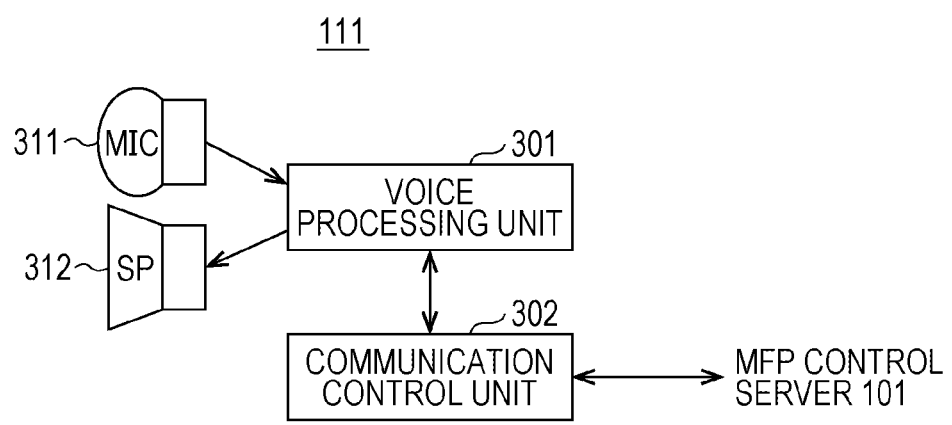
FIG. 3 is a block diagram showing the main configuration of the smart speaker.

As shown in FIG. 3, the smart speaker 111 includes a voice processing unit 301 and a communication control unit 302, and a microphone 311 and a speaker 312 are connected to the voice processing unit 301.

The voice processing unit 301 performs analog-to-digital (AD) conversion on an analog voice signal obtained by collecting sound using the microphone 311 and further generates compression-encoded voice data or restores an analog voice signal from voice data accepted from the communication control unit 302 to cause the speaker 312 to output voice. The communication control unit 302 executes communication processing for transmitting and receiving the voice data and the like to and from the voice AI server 102 via the Internet 103.

[3] Configuration of Voice AI Server 102

Next, the configuration of the voice AI server 102 will be described.

Figure 4:
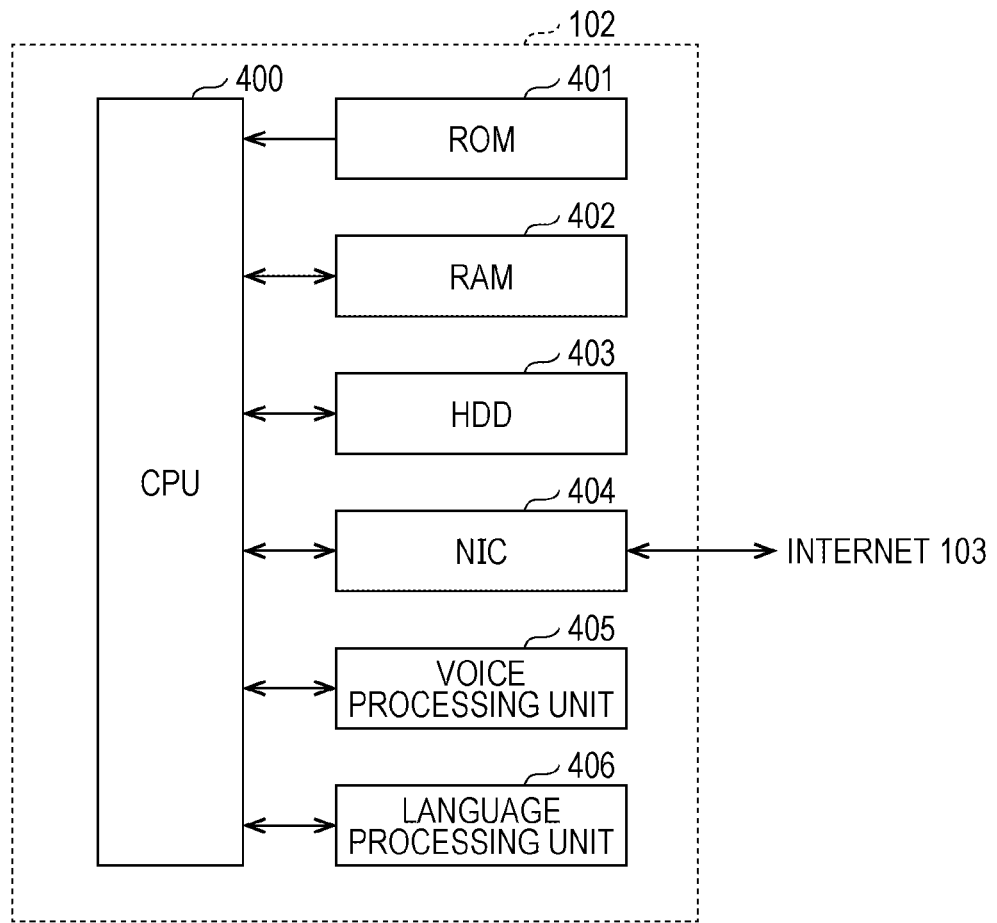
FIG. 4 is a block diagram showing the main configuration of the voice AI server.

As shown in FIG. 4, the voice AI server 102 includes a central processing unit (CPU) 400, a read only memory (ROM) 401, a random access memory (RAM) 402 and the like. The CPU 400 is activated by, after being reset, reading out a boot program from the ROM 401 and reads out and executes an operating system (OS) and other programs from a hard disk drive (HDD) 403, with the RAM 402 serving as working storage.

A network interface card (NIC) 404 executes communication processing for interconnection with the smart speaker 111 and the MFP control server 101 via the Internet 103.

A voice processing unit 405 executes voice recognition processing on the voice data accepted from the smart speaker 111 and voice synthesis processing on the voice data transmitted to the smart speaker 111.

The language processing unit 406 executes natural language analysis processing on text data generated by the voice processing unit 405. Thus, for example, when the user utters a specific keyword toward the smart speaker 111, the voice AI server 102 identifies the keyword, transitions to the voice instruction acceptance mode, recognizes the subsequent voice instruction of the user, and specifies the instruction contents.

[4] Configuration of MFP Control Server 101

Next, the configuration of the MFP control server 101 will be described.

Figure 5:
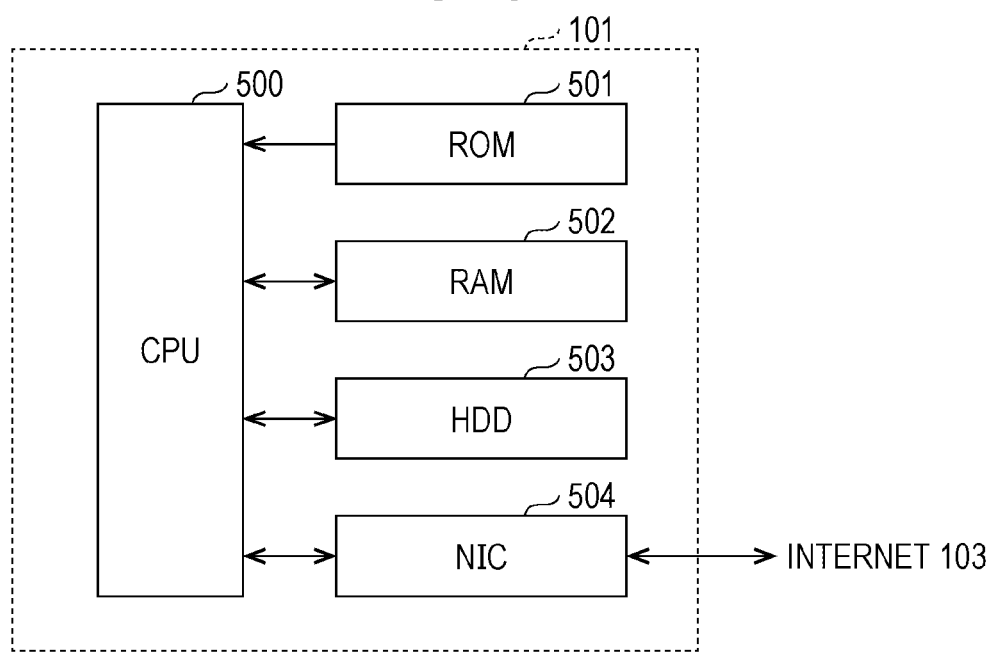
FIG. 5 is a block diagram showing the main configuration of the MFP control server.

As shown in FIG. 5, the MFP control server 101 includes a CPU 500, a ROM 501, a RAM 502 and the like. The CPU 500 is activated by, after being reset, reading out a boot program from the ROM 501 and reads out and executes programs such as an OS from an HDD 503, with the RAM 502 serving as working storage. An NIC 504 executes communication processing for interconnection with the voice AI server 102 and the multifunction peripheral 112 via the Internet 103.

With such configuration, the response text can be generated and transmitted to the voice AI server 102, and the command can be generated and transmitted to the multifunction peripheral 112.

[5] Configuration of Multifunction Peripheral 112

Next, the configuration of the multifunction peripheral 112 will be described. The multifunction peripheral 112 is an image forming apparatus having functions such as monochrome and color image forming functions, a copying function and a facsimile function.

Figure 6:
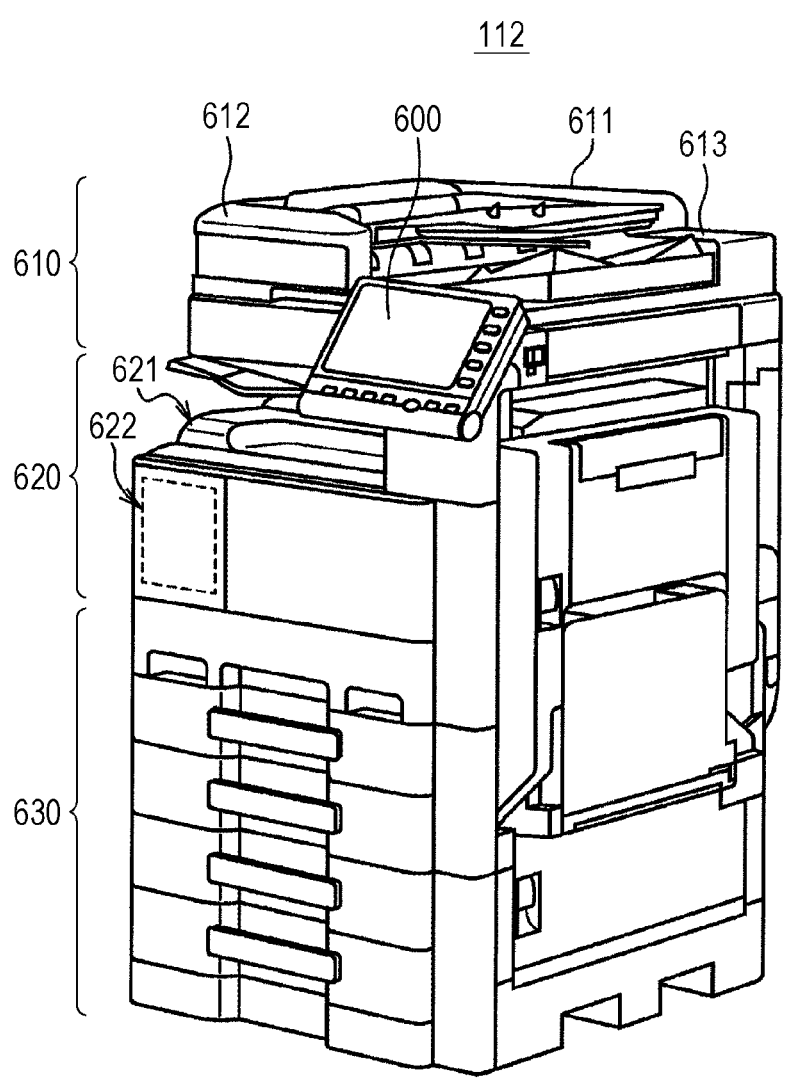
FIG. 6 is an external perspective view showing the main configuration of the multifunction peripheral.

As shown in FIG. 6, the multifunction peripheral 112 includes an image reading unit 610, an image forming unit 620 and a paper feeding unit 630. The image reading unit 610 uses an automatic document feeder (ADF) 612 to feed a document one by one from the bundle of the document set in a document tray 611, reads the document by a so-called sheet-through method, and then discharges the document to a paper discharge tray 613. In this way, image data is generated.

The image forming unit 620 has an image creating unit, a fixing unit and the like. The image creating unit forms a toner image and transfers the toner image onto a recording sheet, and the fixing unit thermally fixes the toner image onto the recording sheet. The image forming unit 620 executes image forming processing by using the image data generated by the image reading unit 610 or image data received via the LAN 113 or the Internet 103. The paper feeding unit 630 accommodates a recording sheet and supplies the recording sheet in parallel with the toner image formation by the image forming unit 620. The recording sheet on which the toner image has been thermally fixed is discharged to the paper discharge tray 621 provided in the in-body space of the multifunction peripheral 112.

The image forming unit 620 includes a manipulation panel 600, which presents information to the user of the multifunction peripheral 112 and accepts instruction input from the user. The image forming unit 620 includes a control unit 622 (not shown), and the control unit 622 controls the operation of the multifunction peripheral 112.

Figure 7:
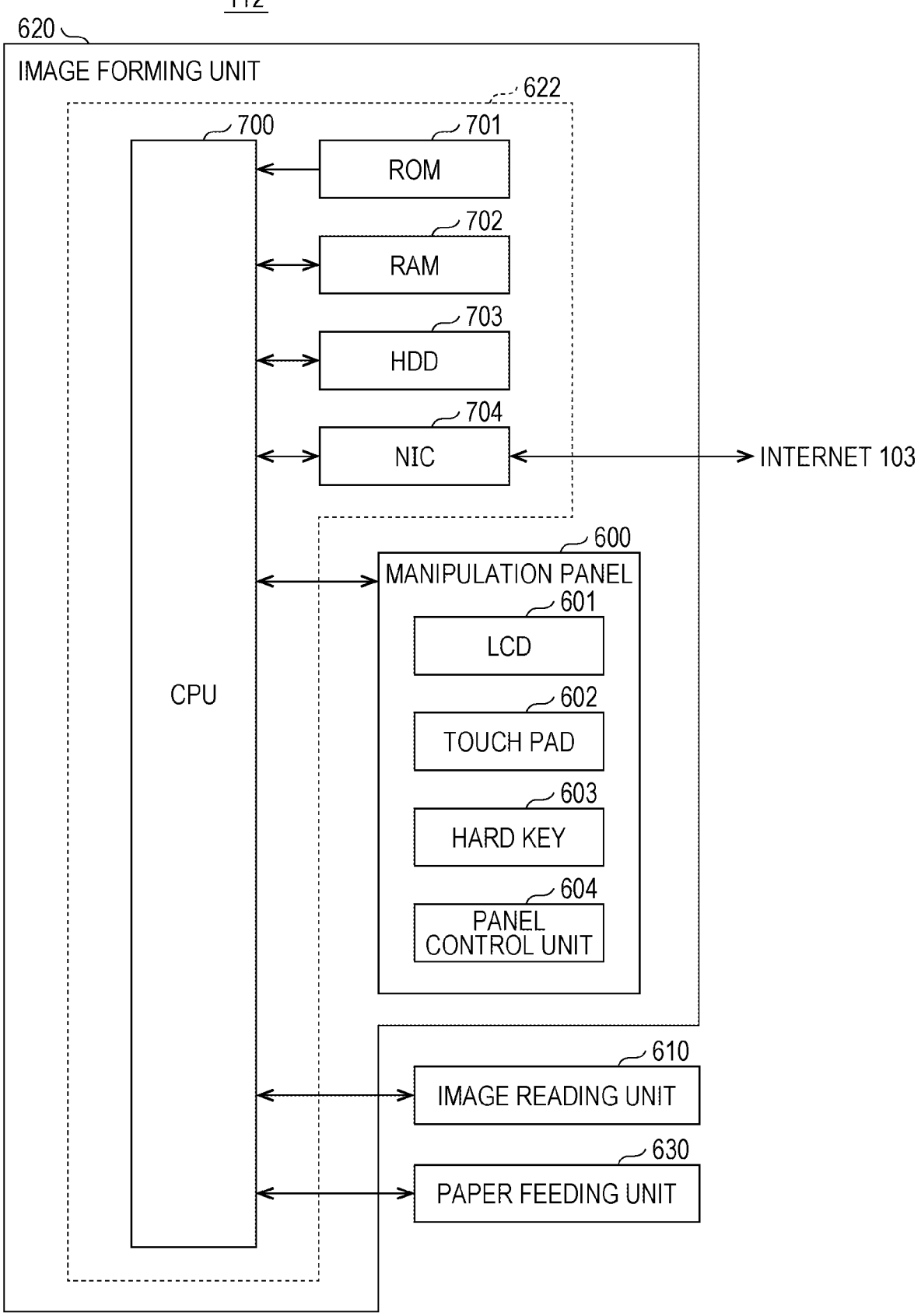
FIG. 7 is a block diagram showing the main configuration of the multifunction peripheral.

As shown in FIG. 7, the control unit 622 includes a CPU 700, a ROM 701, a RAM 702 and the like. The CPU 700 is activated by, after being reset, reading out a boot program from the ROM 701 and reads out and executes programs such as an OS from an HDD 703, with the RAM 702 serving as working storage. An NIC 704 executes communication processing for interconnection with the voice AI server 102 and the multifunction peripheral 112 via the Internet 103.

With such configuration, the control unit 622 controls the operations of the image reading unit 610, the image forming unit 620 and the paper feeding unit 630. In particular, the manipulation panel 600 includes a liquid crystal display (LCD) 601, a touch pad 602, a hard key 603 and a panel control unit 604. The liquid crystal display 601 and the touch pad 602 constitute a touch panel. The panel control unit 604 detects the manipulation of the touch pad 602 and the hard key 603 and controls the display on the liquid crystal display 601.

Moreover, the hard key 603 includes a plurality of keys, with a start key included therein. The user of the multifunction peripheral 112 can instruct the start of job execution by pressing down the start key.

After the job execution is completed, the multifunction peripheral 112 transitions from a job execution mode to a standby mode when there is no job to be executed next. Furthermore, in a case where a predetermined time has elapsed without accepting a job to be executed next after the transition to the standby mode, the multifunction peripheral 112 transitions to a first stage of a sleep mode. In the first stage of the sleep mode, for example, the power consumption is reduced by stopping temperature adjustment of the fixing apparatus, and the backlight of the liquid crystal display 601 is turned off.

In a case where a predetermined time has elapsed further without accepting a job to be executed next after the transition to the first stage of the sleep mode, the multifunction peripheral 112 transitions to a second stage of the sleep mode. The second stage of the sleep mode is a sleep mode in which the power consumption is further reduced compared with the first stage of the sleep mode. For example, the panel control unit 604 for controlling the manipulation panel 600 is also set in a power saving state.

Accordingly, it takes less time (e.g., five seconds) for the multifunction peripheral 112 to return from the first stage of the sleep mode to a state where the manipulation panel 600 can be used, but it takes longer time (e.g., one minute) for the multifunction peripheral 112 to return from the second stage of the sleep mode to the state where the manipulation panel 600 can be used.

When the multifunction peripheral 112 is in a state of the first stage of the sleep mode or the second stage of the sleep mode and accepts a command from the MFP control server 101 to display setting contents of a job, the multifunction peripheral 112 returns from the sleep mode to the standby mode. Accordingly, the MFP control server 101 can transmit, to the multifunction peripheral 112, a command to display the setting contents the job and cause the multifunction peripheral 112 to execute the display in both states of the multifunction peripheral 112 in the first stage of the sleep mode and the second stage of the sleep mode.

Similarly, as for a command other than the command to display the setting contents of the job, the multifunction peripheral 112 can accept the command from the MFP control server 101 and execute processing in accordance with the command in both states of the multifunction peripheral 112 in the first stage of the sleep mode and the second stage of the sleep mode.

[6] Operation of Image Forming System 1

Next, the operation of the image forming system 1 will be described focusing on the operation of the MFP control server 101.

(6-1) Main Routine

Figure 8:
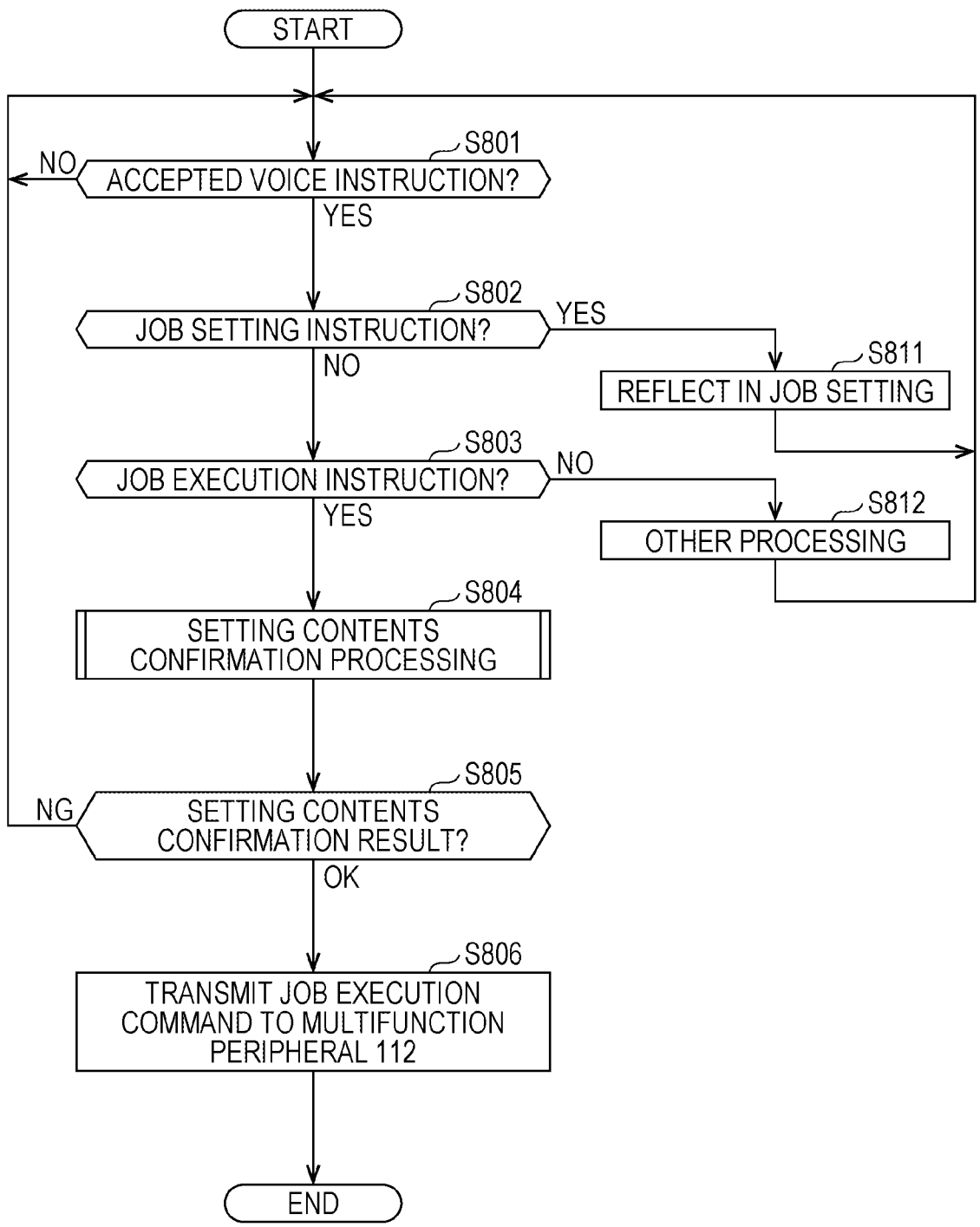
FIG. 8 is a flowchart showing the main operation of the MFP control server.

As shown in FIG. 8, when received the text data of the voice instruction from the voice AI server 102 (S801: Yes), the MFP control server 101 discerns whether the instruction is a job setting instruction (S802). When the instruction is a job setting instruction (S802: Yes), the job setting is recorded in the MFP control server 101 (S811). Specifically, the MFP control server 101 stores in advance a default setting value of each setting item of the job (a copy job, a scan job, or the like) and changes the stored setting value to the instructed setting value. Thereafter, each time a setting instruction is similarly received, the setting value of the setting item is changed in accordance with the instruction.

When it has been judged in Step S802 that the instruction is not a job setting instruction (S802: No), it is judged whether the instruction is a job execution instruction (S803). When it has been judged that the instruction is a job execution instruction (S803: Yes), confirmation processing on the setting contents of the job is executed prior to the execution of the job (S804). This processing is processing for presenting the setting contents of the job to the user to confirm whether or not the setting contents are acceptable. The specific processing contents will be described later.

On the other hand, when it has been judged in Step S803 that the instruction is not a job execution instruction (S803: No), processing other than job execution is executed in accordance with the user instruction (S822). The processing other than the job execution is, for example, processing of replying with the remaining amount of toner in response to an inquiry about the remaining amount of toner.

After the confirmation processing on the setting contents of the job has been executed (S804), the user answers via the smart speaker 111 that there is no problem with the setting contents. When the text data to that effect is received from the voice AI server 102 (S805: OK), a command to instruct execution of the job is transmitted to the multifunction peripheral 112 (S806). When the user answers that there is a problem with the setting contents via the smart speaker 111, the text data to that effect is transmitted from the voice AI server 102 to the MFP control server 101. In this case (S805: NG), the processing returns to Step S801, and processing such as job setting is executed again in accordance with the user instruction.

(6-2) Setting Contents Confirmation Processing (S804)

Figure 9:
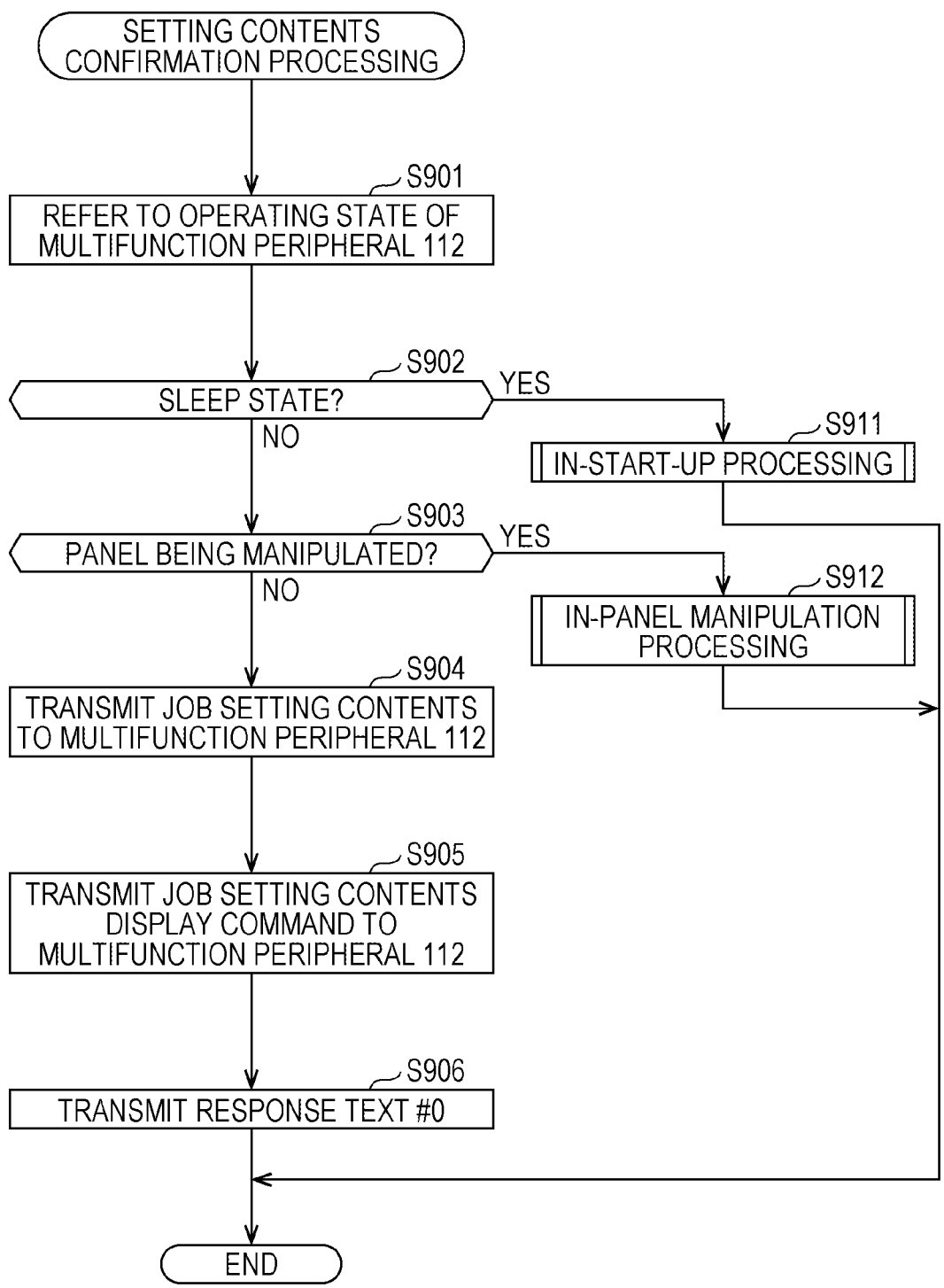
FIG. 9 is a flowchart showing setting content confirmation processing executed by the MFP control server.

FIG. 9 is a flowchart showing specific processing contents of the setting contents confirmation processing in Step S804. First, the MFP control server 101 refers to the operating state of the manipulation panel 600 of the multifunction peripheral 112 (S901). That is, reference is made as to whether the manipulation panel 600 is in a state where the setting contents can be displayed on the liquid crystal display 601, the sleep state, or a state where another person is using (hereinafter referred to as "in-panel manipulation"). As described above, the sleep state becomes deeper in order of the state where the backlight of the liquid crystal display 601 is turned off in the first stage of the sleep mode and the further state where the power sources of units other than the control unit 622 (including the panel control unit 604) are off in the second stage of the sleep mode, as it takes longer for the manipulation panel 600 to be able to display.

The MFP control server 101 always monitors the operating state of the manipulation panel 600. For example, each time the operating state is changed, the multifunction peripheral 112 notifies the MFP control server 101 of the operating state. When received that notification, the MFP control server 101 records the operating state of the manipulation panel 600 in an operating state table. In Step S901, that operating state table is referred.

When the operating state of the manipulation panel 600 is the sleep state (S902: Yes), the in-start-up processing is executed (S911). When the in-start-up processing is completed, the processing returns to the main routine.

When the operating state of the manipulation panel 600 is not the sleep state (S902: NO) and the panel is being manipulated (S903: Yes), the in-panel manipulation processing is executed (S912). When the in-panel manipulation processing is completed, the processing returns to the main routine.

When the operating state of the manipulation panel 600 is not during the panel manipulation (S903: No), to the multifunction peripheral 112, the job setting contents are transmitted (S904), and a command to display the job setting contents is transmitted (S905). The multifunction peripheral 112 displays the received job setting contents on the liquid crystal display 601 in accordance with this command.

In the present embodiment, the setting items that can be set by voice are limited to the main setting items frequently used (hereinafter also referred to as "main setting items") among all the functions of the multifunction peripheral, and the job setting contents transmitted in Step S904 and the job setting contents displayed on the liquid crystal display 601 are the setting contents of all the main setting items. Note that only the setting contents of the setting item changed from the default setting value may be displayed.

In Step S906, a response text #0, which prompts the user to confirm the setting contents displayed on the manipulation panel 600, is transmitted to the voice AI server 102. This response text #0 is, for example, a text in the form of question, such as "Are you sure with the setting contents displayed on the manipulation panel?", so that the answer will be "Yes" or "No".

(6-3) In-Start-Up Processing (S911)

Figure 10:
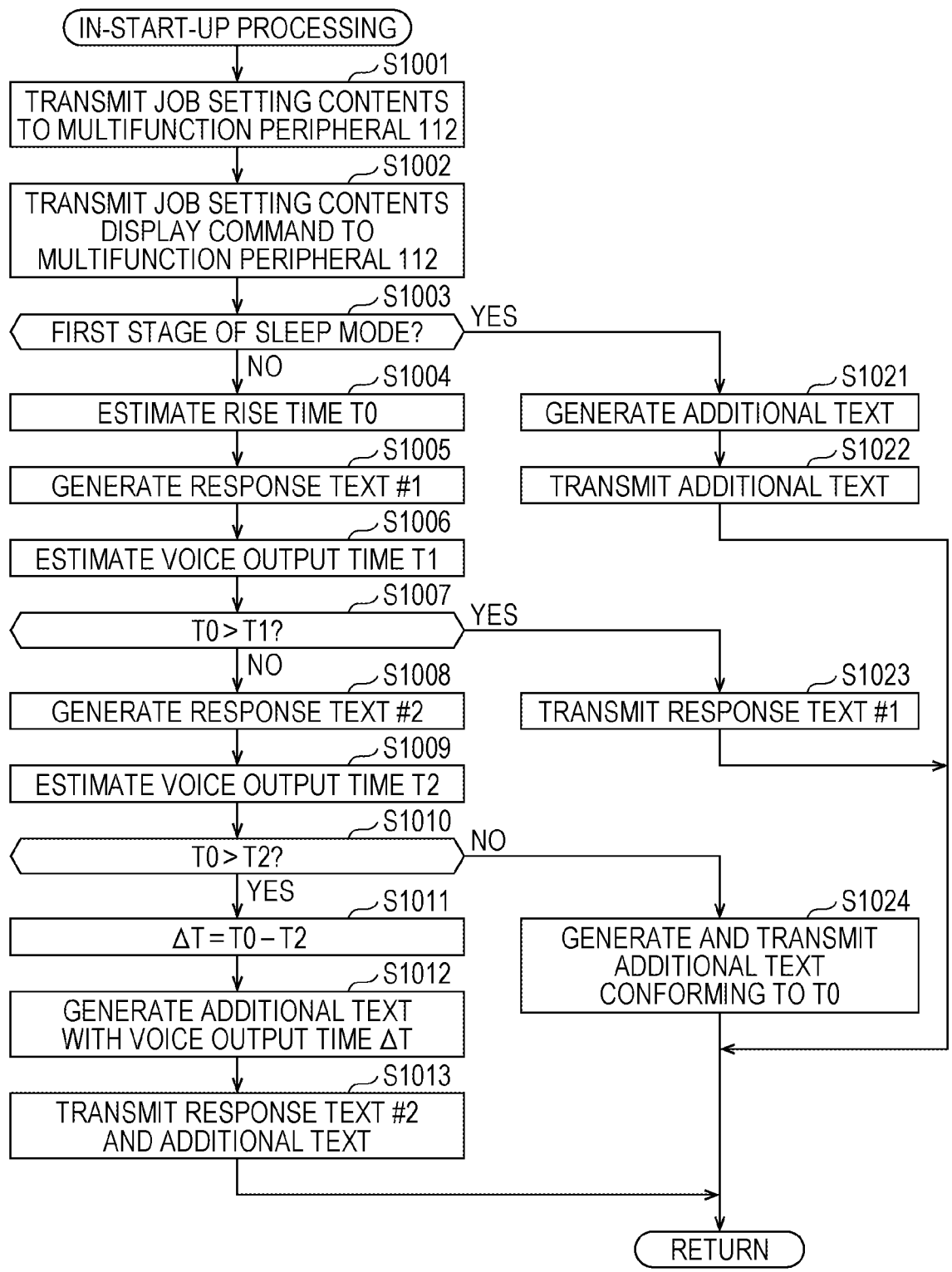
FIG. 10 is a flowchart showing in-start-up processing executed by the MFP control server.

In the in-start-up processing (S911) as shown in FIG. 10, first, to the multifunction peripheral 112, the job setting contents are transmitted (S1001), and the command to display the job setting contents is transmitted (S1002). When received the command, the multifunction peripheral 112 starts the return processing from the sleep mode.

Next, it is determined whether the sleep mode of the manipulation panel 600 is the first stage of the sleep mode or the second stage of the sleep mode. When the sleep mode is the second stage of the sleep mode (S1003: No), a rise time T0 is estimated from the depth of the sleep state of the manipulation panel 600 (S1004). As described above, the sleep state includes the first stage of the sleep mode and the second stage of the sleep mode which are different in time for the manipulation panel 600 to be able to display the job setting contents. Thus, the MFP control server 101, for example, refers to a table, in which the rise time T0 is stored for each depth of the sleep state, thereby estimating the rise time T0. Since the rise time T0 varies depending on the model of the multifunction peripheral, the rise time T0 of each model of the multifunction peripheral is stored in the table. In Step S1004, the rise time T0 of the model of the multifunction peripheral 112 is referred.

Next, a response text #1 is generated (S1005). The response text #1 is a text listing the main setting contents instructed to be displayed on the liquid crystal display 601 of the multifunction peripheral 112. For example, when the aforementioned main setting items of the copy function are setting of the number of copies, color setting, single-sided/double-sided setting of the document, single-sided/double-sided setting for printing, page aggregation setting and staple setting, those setting contents (default settings or settings changed by the user) are referred, and a text is generated such as "Is it ok to copy with the following settings: one copy, full color, single-sided scanning, double-sided printing, 2 in 1, one-point stapling?" Herein, the text is also in the form of question so that the answer will be "Yes" or "No".

When the response text #1 has been generated, a time T1 required to output the response text #1 by voice is estimated (S1006). For example, the voice output time T1 may be estimated by multiplying the number of syllables Ns included in the response text #1 by an appropriate coefficient.

When this voice output time T1 of the response text #1 is compared with the rise time T0 of the manipulation panel 600 and the voice output time T1 is shorter than the rise time T0 (S1007: Yes), the response text #1 is transmitted to the voice AI server 102 (S1023). When received the response text #1, the voice AI server 102 synthesizes response voice data in voice from the response text #1 in the voice processing unit 405 and transmits the response voice data to the smart speaker 111. The smart speaker 111 outputs the response voice data by voice.

In this way, the user can know whether the settings are those desired by the user by the voice before the manipulation panel 600 returns from the sleep mode. Thus, it is possible to confirm the setting contents efficiently in a short period of time compared with a case where the user confirms that the settings are those desired by the user by referring to the display of the manipulation panel 600 after the manipulation panel 600 starts up, without providing the user with any information before the manipulation panel 600 returns from the sleep state. Then, when the settings are those desired by the user, the job execution can be started immediately.

Moreover, when the settings are not those desired by the user, the user can know in advance that effect before the manipulation panel 600 starts up. Thus, the setting contents can be corrected quickly after the start-up, thereby executing the job. In this sense, it is possible to suppress the occurrence of wasteful waiting time for the user and promote smooth utilization of the multifunction peripheral 112.

When the voice output time T1 of the response text #1 is compared with the rise time T0 of the manipulation panel 600 and the voice output time T1 is equal to or longer than the rise time T0 (S1007: No), a response text #2 is generated (S1008). The response text #2 is a text shorter than the response text #1 and is, for example, a text listing only the setting contents changed from the default setting value by the instruction of the user. The response text #2 may also include part of other setting items in addition to the setting contents changed from the default setting value by the instruction of the user.

When the response text #2 has been generated, a time T2 required to output the response text #2 by voice is estimated (S1009). Also in this case, the voice output time T2 can be estimated by multiplying the number of syllables Ns included in the response text #2 by an appropriate coefficient.

When the voice output time T2 is compared with the rise time T0 and the voice output time T2 is shorter than the rise time T0 (S1010: Yes), a difference time ΔT is calculated by subtracting the voice output time T2 from the rise time T0 (S1011), and an additional text having a voice output time equal to the difference time ΔT is generated (S1012). In this case, for example, it is only required to generate an additional text having a length equal to the number of syllables Ns calculated by dividing the difference time ΔT by an appropriate coefficient.

For the additional text, for example, a text such as "Today, it is likely to rain from the evening. Do you have an umbrella?" may be generated. Such text may be a text with an appropriate number of syllables Ns selected from among texts prepared in advance. If the additional text is outputted by voice prior to the response text #2, the response text #2 can be outputted by voice immediately before the multifunction peripheral 112 starts up while the attention of the user does not deviate from the output voice of the smart speaker 111 and stays at the smart speaker 111. Accordingly, it is possible to prevent the user from missing the contents of the response text #2 after the multifunction peripheral starts up, and thus smooth utilization of the multifunction peripheral 112 can be promoted.

The generated additional text is transmitted to the voice AI server 102 together with the response text #2 (S1013). When received these texts, the voice AI server 102 synthesizes response voice data in voice in the voice processing unit 405 and transmits the response voice data to the smart speaker 111. The smart speaker 111 outputs the response voice data by voice.

In this way, it is possible to judge whether or not the voice instruction of the user has been correctly recognized in voice utilizing the time until the multifunction peripheral 112 starts up. Thus, when it has been judged that the voice is not correctly recognized, it is possible to quickly correct the setting difference by manipulating the manipulation panel 600 after the manipulation panel 600 starts up.

When the voice output time T2 of the response text #2 is compared with the rise time T0 of the manipulation panel 600 and the voice output time T2 is equal to or longer than the rise time T0 (S1010: No), the rise time T0 is short so that there is no problem even if the user confirms the setting contents displayed after the manipulation panel 600 starts up. Similar to the case of the first stage of the sleep mode described later (S1003: Yes), an additional text conforming to the rise time T0 is generated and transmitted to the voice AI server 102 (S1024), and the processing returns to the main routine.

When the sleep state of the multifunction peripheral 112 is the first stage of the sleep mode (S1003: Yes), an additional text with a voice output time equal to the rise time T0 (five seconds in the present embodiment) from the first stage of the sleep mode is generated as in Step S1012 (S1021), and only the generated additional text is transmitted to the voice AI server 102 (S1022). When received the additional text, the voice AI server 102 synthesizes response voice data in voice in the voice processing unit 405 and transmits the response voice data to the smart speaker 111 to output the voice.

In the first stage of the sleep mode, the rise time T0 is short, so the waiting time for the user is short. Thus, there is no problem even if the user confirms the setting contents displayed after the manipulation panel 600 starts up. Therefore, the setting contents of the job are not read aloud. Moreover, if the additional text is read aloud, the user can be easily aware of that the image forming system 1 is operating normally. Note that the length of the additional text may be zero. That is, the voice output may be canceled as necessary. The same applies to the response texts #1 and #2.

(6-4) In-Panel Manipulation Processing (S912)

Figure 11:
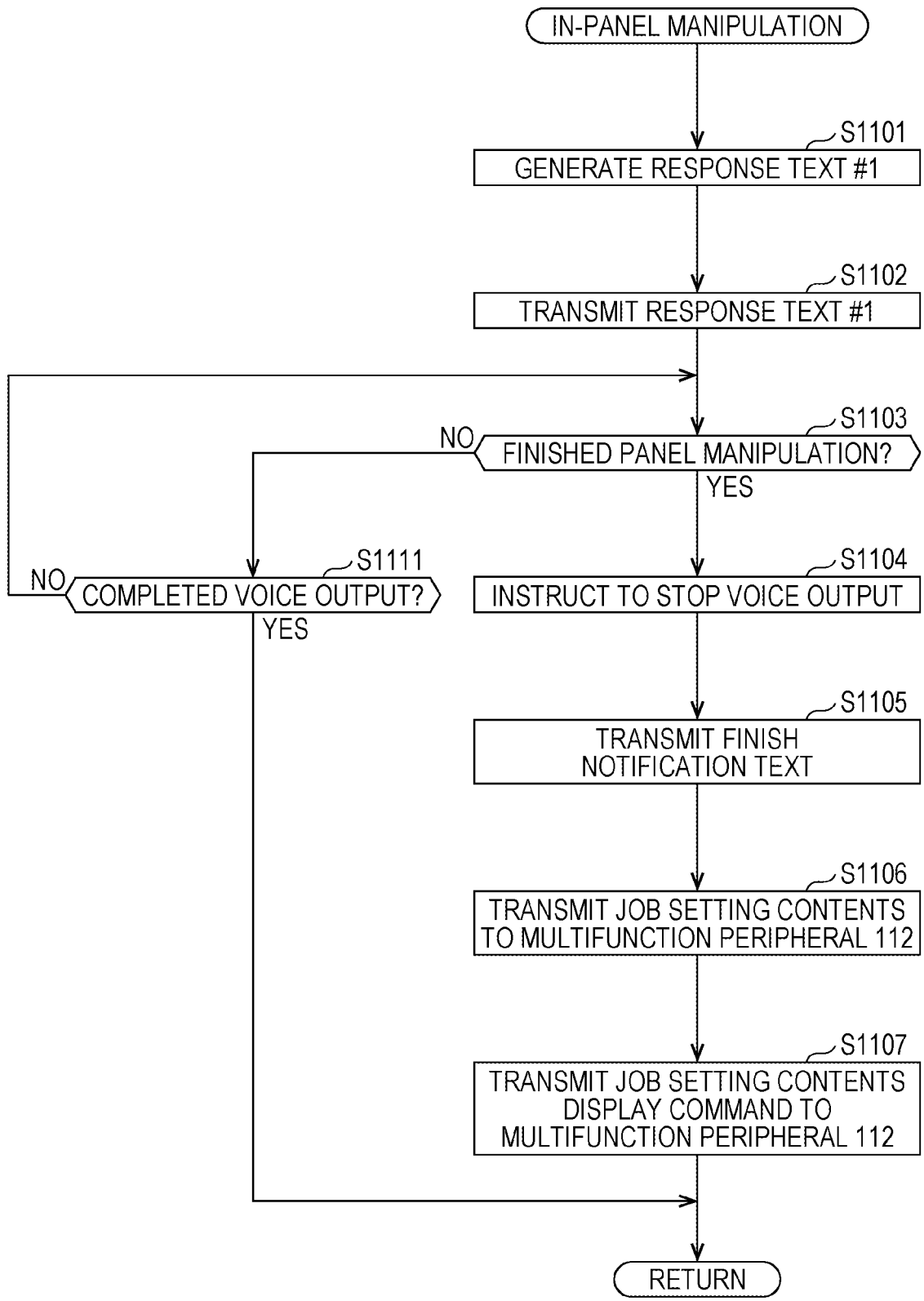
FIG. 11 is a flowchart showing in-panel manipulation processing executed by the MFP control server.

In the in-panel manipulation processing (S912) as shown in FIG. 11, first, a response text #1 is generated (S1101). The response text #1 is a text listing the main setting contents instructed to be displayed on the liquid crystal display 601 of the multifunction peripheral 112 as in the in-start-up processing (S911). When the response text #1 has been generated, the response text #1 is transmitted to the voice AI server 102 (S1102). When received the response text #1, the voice AI server 102 synthesizes response voice data in voice from the response text #1 in the voice processing unit 405 and transmits the response voice data to the smart speaker 111. The smart speaker 111 outputs the response voice data by voice.

Thereafter, the MFP control server 101 monitors the operating state of the manipulation panel 600. When the manipulation of the manipulation panel 600 by another user is finished (1103: Yes), the voice AI server 102 is instructed to stop the voice output by the smart speaker 111 (S1104), and a finish notification text notifying that the manipulation of the manipulation panel 600 by another user has been finished is transmitted to the voice AI server 102 (S1105). Moreover, the multifunction peripheral 112 is notified of the job setting contents (S1106), and a command to display the job setting contents is transmitted to the multifunction peripheral 112 (S1107). The multifunction peripheral 112 displays the received job setting contents on the liquid crystal display 601 in accordance with this command.

Note that whether or not the manipulation of the manipulation panel 600 by another user has been finished can be determined by whether or not the start key of the manipulation panel 600 has been pressed down, whether or not a predetermined time has elapsed since the last input manipulation using the manipulation panel 600 was performed, whether or not another user has logged out from the multifunction peripheral 112, or the like.

Furthermore, for example, the finish notification text is a text such as "MFP is not used anymore, so the setting contents are displayed on the manipulation panel. Are the setting contents displayed on the manipulation panel ok?" Further, if there is work necessary for job execution, a text prompting to do the work may be added. For example, the text is such as "Please set the document".

When received the above instruction and finish notification text, the voice AI server 102 instructs the smart speaker 111 to immediately stop the voice output as well as generates voice data of the finish notification from the finish notification text and transmits the voice data to the smart speaker 111 to output the voice. In addition, the multifunction peripheral 112 displays the setting contents of the job on the manipulation panel 600.

When the voice output of the response text #1 is completed (S1111: Yes) before the manipulation of the manipulation panel 600 by another user is finished (S1103: No), a notification is transmitted from the voice AI server 102 to the MFP control server 101, the MFP control server 101 ends the in-panel manipulation processing, and the processing returns to the setting contents confirmation processing. As a result, the processing returns to the main routine as described above.

In this way, the user can know whether the settings are those desired by the user by the voice during the panel manipulation by another user. Thus, when the settings are those desired by the user, it is possible to start the job execution by pressing down the start key immediately after another user has finished the panel manipulation compared with a case where the user confirms that the settings are those desired by the user by referring to the display of the manipulation panel 600 and presses down the start key of the manipulation panel 600 after the panel manipulation is finished, without providing the user with any information before the panel manipulation is finished by another user.

When the settings are not those desired by the user, the user can know in advance that effect before the panel manipulation by another user is finished. Thus, the setting contents can be corrected quickly after the finish, thereby executing the job. In this sense, it is possible to suppress the occurrence of wasteful waiting time for the user and promote smooth utilization of the multifunction peripheral 112.

[7] Modification Examples

As described above, the present disclosure has been described based on the embodiments. However, as a matter of course, the present disclosure is not limited to the above-described embodiments, and the following modification examples can be carried out.

(7-1) The example, in which the response text #1 is stopped (S1104) when the panel manipulation by another user is finished (S1103: Yes), has been described in the above embodiments. However, it is needless to say that the present disclosure is not limited thereto, and the finish notification text may be transmitted (S1105) after the response text #1 is outputted to the end by voice.

Moreover, when the response text #1 is outputted to the end by voice, it is judged that the user has grasped the setting contents so that the setting contents need not be displayed on the manipulation panel 600 of the multifunction peripheral 112. Furthermore, even when the response text #1 is outputted to the end by voice, the setting contents may be displayed on the manipulation panel 600 of the multifunction peripheral 112 just in case.

(7-2) The example, in which the multifunction peripheral 112 displays the setting contents of the job on the manipulation panel 600 (S1106 and S1107) when the panel manipulation by another user has finished (S1103: Yes), has been described in the above embodiments. However, it is needless to say that the present disclosure is not limited thereto, and the following may be performed instead. That is, when the portion of the response text #1, which has been outputted by voice, is equal to or greater than a predetermined proportion of the entire response text #1, or when the portion of the response text #1, which has not been outputted by voice, is only the default setting, it is judged that the user could confirm the setting contents of the job sufficiently, and the setting contents may not be displayed on the manipulation panel 600 of the multifunction peripheral 112.

On the other hand, when the portion of the response text #1, which has been outputted by voice, is less than a predetermined proportion of the entire response text #1, or when the portion of the response text #1, which has not been outputted by voice, includes settings other than the default settings, it is judged that the user could not confirm the setting contents of the job sufficiently, and the setting contents may be displayed on the manipulation panel 600 of the multifunction peripheral 112.

(7-3) The example, in which the multifunction peripheral 112 displays the setting contents of the job on the manipulation panel 600 (S1106 and S1107) when the panel manipulation by another user has finished (S1103: Yes), has been described in the above embodiments. However, it is needless to say that the present disclosure is not limited thereto, and the following may be performed instead. That is, along with the voice output of the finish notification text, the user may be inquired whether or not to display the setting contents on the manipulation panel 600 of the multifunction peripheral 112 to switch the display of the setting contents in accordance with the response of the user.

(7-4) In the above embodiments, the configuration is such that the execution of the job is started when the user has answered that there is no problem as a result of the confirmation of the setting contents. However, the execution of the job may be started by the user pressing down the start key provided in the manipulation panel 600 of multifunction peripheral 112.

(7-5) The example, in which it is judged whether or not the panel manipulation by another user has been finished (S1103), has been described in the above embodiments. However, it is needless to say that the present disclosure is not limited thereto. Instead, it may be judged whether or not an error state such as out of paper, out of toner, cover opened or the like has been resolved. When the error state has been resolved, the voice output of the response text #1 is stopped, the settings contents are displayed on the manipulation panel 600 of the multifunction peripheral 112, and the instruction of the user to execute the job is waited. Then, the execution of the job may be started.

Even in this case, the execution of the job can be started early by the user listening to the voice output of the setting contents of the job before the error state is resolved compared with a case where the user confirms the setting contents of the job by the manipulation panel 600 of the multifunction peripheral 112 after the error state has been resolved.

(7-6) The example, in which the voice input/output is performed using the smart speaker 111, has been described in the above embodiments. However, it is needless to say that the present disclosure is not limited thereto, and the voice input/output may be performed by using a device other than the smart speaker 111, such as a smartphone, instead of the smart speaker 111. In addition, when a device other than the smart speaker 111 is used, such as a smartphone, the device may have functions of both the smart speaker 111 and the voice AI server 102.

(7-7) The example, in which the MFP control server 101 and the voice AI server 102 are the cloud servers, has been described in the above embodiments. However, it is needless to say that the present disclosure is not limited thereto, and other server apparatuses may be employed. For example, a server apparatus connected to the LAN 113 or a server apparatus integrated with the multifunction peripheral 112 may be used as the MFP control server 101 and the voice AI server 102.

(7-8) The example, in which the response text #1 is a text listing the main setting contents instructed to be displayed on the liquid crystal display 601 of the multifunction peripheral 112 and the response text #2 is text listing only the setting contents changed from the default setting value by the voice instruction of the user, has been described in the above embodiments. However, it is needless to say that the present disclosure is limited thereto. When it takes longer for the response text #1 than the response text #2 to be outputted by voice, the text contents of the response texts #1 and #2 may be different from those in the above embodiments.

Note that the main setting contents may be, for example, default settings of a setting item displayed on the top of the setting screen for setting the job on the manipulation panel 600 of the multifunction peripheral 112. For example, in a case of a copy job, the setting items are "density," "background adjustment," "paper," "magnification," "document>output," and "page aggregation".

Note that the setting contents included in the response text #1 may be only the setting contents instructed by the user in voice or only the default settings. In addition, the default settings may include the setting contents regarding the setting items displayed on the setting screen other than the top on the setting screen, or conversely, may not cover all setting items displayed on the top of the setting screen.

Similarly, the response text #2 may be only the default settings or may be the mixture of the setting contents instructed by the user in voice and the default settings.

Regardless of the contents of the response texts #1 and #2, the effects of the present disclosure can be obtained if the voice output time of the response text #1 is longer than the voice output time of the response text #2.

(7-9) The example, in which the response text #1 is outputted by voice when another user is manipulating the panel, has been described in the above embodiments. However, it is needless to say that the present disclosure is not limited thereto, and the additional text may be outputted by voice in addition to the response text #1. For example, in a case where the panel manipulation by another user is not finished even after the response text #1 has been outputted by voice, an additional text such as "Please wait for a while as another user is currently manipulating the image forming apparatus. We will introduce you new service of our company until then." may be outputted in voice.

(7-10) The example, in which the voice instruction is performed to the color multifunction peripheral 112, has been described in the above embodiments. However, it is needless to say that the present disclosure is not limited thereto, and the voice instruction may be performed to a monochrome multifunction peripheral instead. The same effects can also be obtained by applying the present disclosure to a single function machine such as a printing apparatus, a copying apparatus with a scanner, and a facsimile apparatus with a facsimile communication function.

(7-11) In the above embodiments, the configuration is such that the MFP server 101 stores a default setting value in advance for each job setting item for a job (a copy job, a scan job, or the like), that stored setting value is changed to a setting value instructed by voice, and the setting contents thereof are collectively transmitted to the multifunction peripheral 112 after the instruction to execute the job is received. However, the MFP control server 101 may transmit, to the multifunction peripheral 112, the settings instructed by voice each time and reflect the settings of the job in the multifunction peripheral 112.

(7-12) In the above embodiments, the smart speaker 111, the MFP control server 101, and the voice AI server 102 are configured as apparatuses different from the multifunction peripheral 112, but all or part thereof may be built in the multifunction peripheral 112.

Moreover, when the multifunction peripheral 112 is provided with a voice input/output interface, apparatuses that accept manual input (e.g., the touch pad 602 and the hard key 603) may be omitted from the manipulation panel 600, and only the liquid crystal display 601 may be provided. Also in this case, a microphone and a speaker for voice input/output may be provided.

(7-13) The example, in which the setting contents regarding the processings executed by the multifunction peripheral 112 are displayed on the liquid crystal display 601 of the manipulation panel 600, has been described in the above embodiments. However, it is needless to say that the present disclosure is not limited thereto, and a display apparatus different from the manipulation panel 600 may be provided to display the setting contents. For example, the setting contents according to the voice instruction accepted by the smart speaker 111 may be displayed on a personal computer (PC) or a portable terminal apparatus, which are connected to the multifunction peripheral 112 via a communication network and serve as display apparatuses. In this example, the same effects can be obtained if the contents to be outputted by voice are decided in accordance with the operating state of the display apparatus.

(7-14) As described above, the image forming system 1 and the MFP control server 101 are computer systems each including a microprocessor and a memory. The memory may store a computer program, and the microprocessor may operate in accordance with the computer program.

Herein, the computer program is constituted by combining a plurality of computer instruction codes indicating commands for a computer in order to achieve a predetermined function.

Moreover, the computer program may be recorded on a computer-readable recording medium such as a flexible disk, a hard disk, an optical disk or a semiconductor memory.

Furthermore, the computer program may be sent via a wired or wireless telecommunication line, a network represented by the Internet, data broadcasting, or the like. (7-15) Each combination of the above embodiments and the above modification examples is possible.

The control apparatus, the image forming system and the program according to the present disclosure are useful as techniques for suppressing prolongation of a waiting time for a user to give a voice instruction to an image forming apparatus.

Although embodiments of the present disclosure have been described and illustrated in detail, the disclosed embodiments are made for purposes of illustration and example only and not limitation. The scope of the present disclosure should be interpreted by terms of the appended claims.

As used herein, the words "can" and "may" are used in a permissive (i.e., meaning having the potential to), rather than mandatory sense (i.e., meaning must). The words "include," "includes," "including," and the like mean including, but not limited to. Similarly, the singular form of "a" and "the" include plural references unless the context clearly dictates otherwise. And the term "number" shall mean one or an integer greater than one (i.e., a plurality).

What is claimed is:

1. A control apparatus that causes an image forming apparatus to execute processing based on contents of the processing instructed by voice, the control apparatus comprising:
a hardware processor that:
causes a display apparatus of the image forming apparatus to display the contents of the processing prior to execution of the processing;
acquires an operating state of the display apparatus; and
decides contents of voice to be outputted to promote confirmation of the contents of the processing in accordance with the acquired operating state of the display apparatus.

2. The control apparatus according to claim 1, wherein the operating state includes an operating state as to whether the display apparatus is in a sleep mode where at least part of a power source of the display apparatus is turned off.

3. The control apparatus according to claim 2, further comprising:
a first stage of a sleep mode with a first predetermined time for the display apparatus to be able to display the contents of the processing; and
a second stage of a sleep mode with a second predetermined time longer than the first predetermined time to enable display in the sleep mode,
wherein the hardware processor acquires the sleep mode in one of the first stage or the second stage, and
wherein the hardware processor decides the contents of the voice to be outputted based on one of the first stage or the second stage of the sleep mode acquired by the hardware processor.

4. The control apparatus according to claim 1, wherein the hardware processor further estimates a rise time for the display apparatus to be able to display from the operating state acquired by the hardware processor, and
wherein the hardware processor decides the contents of the voice in accordance with the rise time.

5. The control apparatus according to claim 4, wherein the hardware processors decides the contents of the voice so as to include all of predetermined items, when the rise time is longer than an output time required to output the predetermined items by voice, and
wherein the hardware processors decides the contents of the voice so as to include items excluding at least some items from the predetermined items, when the rise time is shorter than the output time.

6. The control apparatus according to claim 4, wherein the hardware processor further decides additional contents other than the contents of the voice in accordance with an extra time obtained by subtracting, from the rise time, the output time required to output the contents of the voice by voice decided by the hardware processor.

7. The control apparatus according to claim 1, wherein the hardware processor further determines whether a user other than a user, who has inputted the contents of the processing by voice, is using the display apparatus,
wherein the hardware processor further continues voice output of the contents of the voice until a determination result by the hardware processor becomes negative, after deciding the contents of the voice by the hardware processor, and
wherein the hardware processor further stops the voice output, when the determination result of the hardware processor becomes negative.

8. The control apparatus according to claim 7, wherein the contents of the voice decided by the hardware processor are divided into a plurality of portions, and
wherein the hardware processor stops the voice output at a time of completing the voice output of a portion being outputted, when the determination result by the hardware processor becomes negative.

9. The control apparatus according to claim 7, wherein the hardware processor does not stop the voice output in a case where an output time of the contents of the voice, which are decided by the hardware processor and not yet outputted, is shorter than a predetermined time, when the determination result by the hardware processor becomes negative.

10. The control apparatus according to claim 7, wherein the hardware processor further prohibits the display apparatus to display the contents of the processing, when the voice output is not stopped by the hardware processor.

11. The control apparatus according to claim 7, wherein the hardware processor further causes the user, who has performed voice input, to confirm whether the contents of the processing are displayed on the display apparatus, when the hardware processor does not stop the voice output, and
wherein the contents of the processing are displayed, when a confirmation result is positive.

12. The control apparatus according to claim 11, wherein the hardware processor further causes the image forming apparatus to start the processing without waiting for the user, who has performed the voice input to instruct a start of the processing, when the confirmation result is negative.

13. The control apparatus according to claim 7, wherein the hardware processor, when the contents of the processing are displayed on the display apparatus after being stopped, further outputs that effect by the voice.

14. An image forming system, comprising:
an image forming apparatus; and
the control apparatus according to claim 1.

15. A non-transitory recording medium storing a computer readable program causing a computer to control an image forming apparatus to execute processing based on contents of the processing instructed by voice, the program causing the computer to execute:
causing a display apparatus of the image forming apparatus to display the contents of the processing prior to execution of the processing;
acquiring an operating state of the display apparatus; and
deciding contents of voice to be outputted to promote confirmation of the contents of the processing in accordance with the operating state of the display apparatus acquired.

16. A control apparatus that causes an image forming apparatus to execute processing based on contents of the processing instructed by voice, the control apparatus comprising:
a hardware processor that:
estimates an amount of time for a display apparatus of the image forming apparatus to be able to rise from an operating state and perform a display of the contents of the processing;
causes the display apparatus to perform the display prior to execution of the processing; and
decides contents of voice to be outputted to promote confirmation of the contents of the processing in accordance with the amount of time.

* * * * *